United States Patent
Kuehnemund et al.

(10) Patent No.: US 7,117,855 B1
(45) Date of Patent: Oct. 10, 2006

(54) DIESEL RESERVOIR ICE BYPASS VALVE

(75) Inventors: Bruce A. Kuehnemund, Flushing, MI (US); Jeffery W. Beyer, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/375,511

(22) Filed: Mar. 14, 2006

(51) Int. Cl.
*F02M 37/04* (2006.01)

(52) U.S. Cl. .................. 123/510; 123/198 D; 123/509; 210/416.4; 137/113; 137/590

(58) Field of Classification Search ................ 123/510, 123/509, 514, 198 D; 210/539, 416.4, 440, 210/443, 130; 137/605, 544, 907, 111, 113, 137/115.01, 115.13, 565.01, 590
See application file for complete search history.

(56) References Cited

U.S. PATENT DOCUMENTS

| | | | | |
|---|---|---|---|---|
| 4,807,582 A | * | 2/1989 | Tuckey | 123/514 |
| 4,974,570 A | * | 12/1990 | Szwargulski et al. | 123/509 |
| 5,218,942 A | * | 6/1993 | Coha et al. | 123/514 |
| 5,330,475 A | * | 7/1994 | Woodward et al. | 417/89 |
| 5,415,146 A | * | 5/1995 | Tuckey | 123/509 |
| 5,560,342 A | * | 10/1996 | Fournier et al. | 123/509 |
| 5,623,907 A | * | 4/1997 | Cotton et al. | 123/456 |
| 5,724,947 A | * | 3/1998 | Takaki et al. | 123/509 |
| 5,762,050 A | * | 6/1998 | Gonzalez | 123/516 |
| 6,170,470 B1 | * | 1/2001 | Clarkson et al. | 123/497 |
| 6,776,185 B1 | | 8/2004 | Farrar et al. | |
| 6,851,396 B1 | * | 2/2005 | Fromont | 123/1 A |

* cited by examiner

*Primary Examiner*—Carl S. Miller
(74) *Attorney, Agent, or Firm*—Paul L. Marshall

(57) ABSTRACT

A diesel fuel delivery system that maintains optimum fuel delivery to the engine despite the presence of an ice blockage at the fuel strainer. Ice formation in diesel fuel can cause fuel blockage at the fuel strainer and generate high vacuum conditions as the engine tries to draw fuel from the tank. A normally closed bypass valve automatically opens in response to an engine vacuum condition higher than normal engine vacuum levels. Upon the bypass valve opening, fuel is drawn through an auxiliary inlet port and line located above the ice formation in the tank.

3 Claims, 2 Drawing Sheets

DIESEL RESERVOIR ICE BYPASS VALVE

TECHNICAL FIELD

The present invention relates to vehicle fuel system handling systems, and more particularly, to an ice bypass valve in a diesel fuel delivery system.

BACKGROUND OF THE INVENTION

Present day diesel fuel delivery systems may include an assembly commonly referred to as a "modular reservoir assembly" or "MRA". An MRA includes a fuel reservoir and is located within the fuel tank. The reservoir collects fuel from the tank via a "passive fill" valve located on the bottom of the reservoir and an "active fill" jet pump operating on return fuel from the engine. An engine or frame mounted fuel pump pulls the fuel from the reservoir through fuel lines leading to the engine. A strainer is provided at the inlet to the fuel line to capture particulate from the fuel prior to entering the fuel line.

Diesel fuel is known to absorb moisture and form ice at low engine start-up temperatures (e.g., at or below about −20° C.). Ice formation at the bottom of the fuel reservoir may block the fuel strainer inlet. Should this occur, the engine may not start or will run inefficiently until the ice has melted. Therefore, there exists a need for a diesel fuel delivery system which will not be adversely affected by ice forming in the fuel reservoir.

SUMMARY OF THE INVENTION

The present invention successfully addresses the above need by providing a fuel bypass for a diesel fuel delivery system that maintains optimum fuel delivery to the engine despite the presence of an ice blockage at the fuel strainer. The bypass valve operates to open upon a high vacuum condition at the main fuel line. A high vacuum condition is indicative of the engine trying to pull fuel from the reservoir where the fuel is being partly or wholly blocked from entering the fuel line due to ice formation. The bypass opens under this high vacuum condition and fuel is pulled through an auxiliary fuel line from the tank or reservoir at a location above the ice formation. Once fuel has entered the main fuel line and has been heated by the engine, any unused fuel returning to the reservoir heats and melts the ice. Once the ice blockage has been removed, the high vacuum condition is relieved and the bypass valve closes, returning fuel delivery over to the main fuel delivery assembly.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
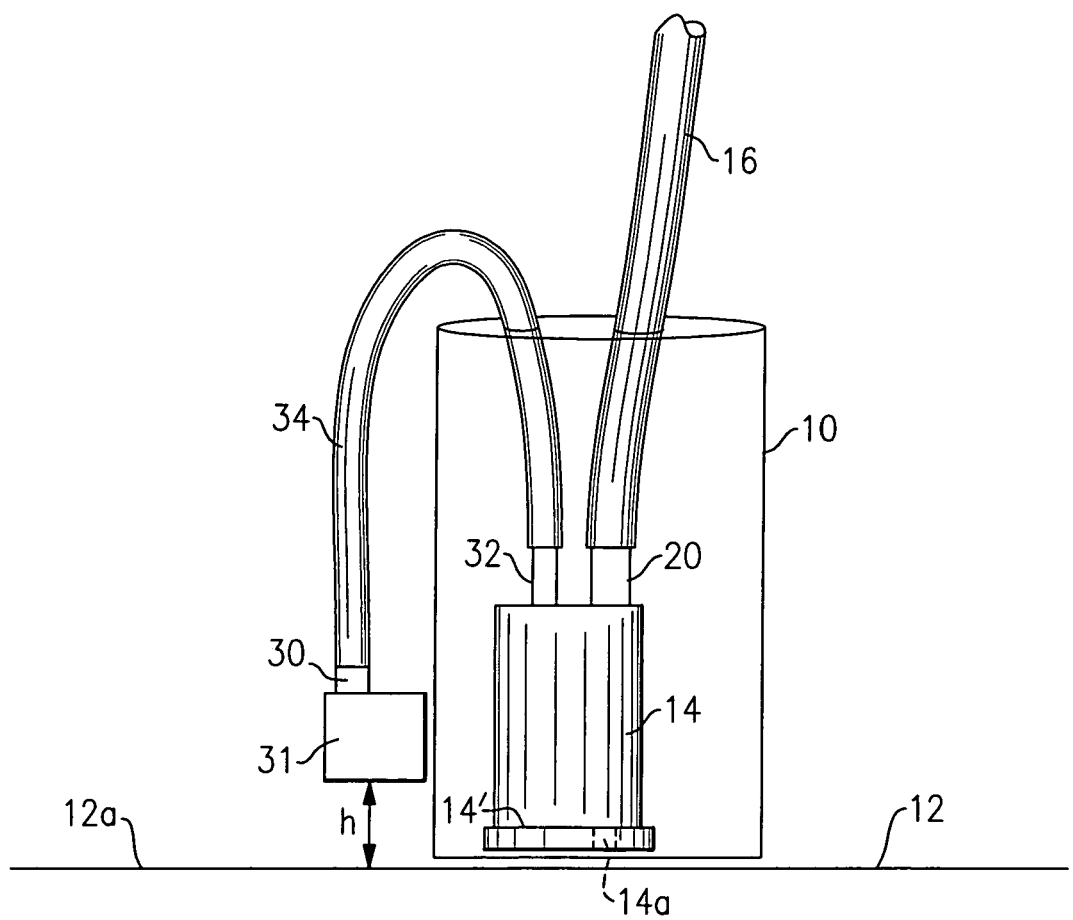
FIG. 1 is a simplified elevational view of components of a fuel delivery system in accordance with a first embodiment of the invention.

Referring to FIG. 1, a first embodiment of the invention is seen to include a fuel reservoir 10 positioned in a fuel tank 12. A fuel strainer 14 is positioned in the reservoir 10 and operates by removing particulate from the fuel prior to the fuel entering main fuel line 16 leading to the vehicle engine (not shown). Appropriate fuel return lines/tubes and fill jets and valves (not shown) are incorporated into reservoir 10 in a known manner to deliver fuel from the tank and fuel return line to the area surrounding the strainer fuel inlet 14a in the reservoir. See, for example, commonly owned U.S. Pat. No. 6,776,185 which is incorporated herein by reference.

When the outside temperature falls below about −20° C., diesel fuel in tank 12 and reservoir 10 absorbs moisture and may form ice that partly or wholly blocks fuel from entering the strainer inlet 14a near the strainer bottom 14'. Such blockage will cause a high vacuum condition to exist at fuel strainer outlet connector 20. If the strainer inlet is totally blocked by ice, the engine will not receive any fuel and will not start. If the strainer is partly blocked by ice, the fuel flow is restricted and the engine will not run at normal operating efficiency until the ice blockage is removed.

The present invention provides a fuel bypass including a normally closed bypass valve 30 (e.g., an umbrella valve) that opens in response to a vacuum condition at outlet connector 20 higher than normal engine vacuum levels. "The word "normal" as used herein means engine vacuum levels occurring without any blockage at the fuel strainer fuel inlet.

Once valve 30 is opened, fuel flows from auxiliary fuel inlet port 31 through an auxiliary fuel line 34 extending between top-mounted strainer inlet connector 32 and the bypass valve 30. The auxiliary fuel inlet port 31 is positioned above the bottom wall 12a of fuel tank 12 such that it is located in the fuel above where ice will form first (i.e., near the bottom of the tank). Auxiliary fuel inlet port 31 is preferably located at a height "h" of about 1–50 mm above the tank bottom 12a, although the exact location of the auxiliary fuel inlet port 31 and valve 30 may vary according to the specific fuel assembly design being employed in a particular vehicle application. The principle concern when choosing the height "h" is that the auxiliary inlet port be above the height of any ice formation. As such, liquid, unfrozen diesel fuel is available for delivery through bypass 30, auxiliary fuel line 34 and strainer 14 whereupon the fuel exits through fuel line 16 and travels toward the engine.

Figure 2:
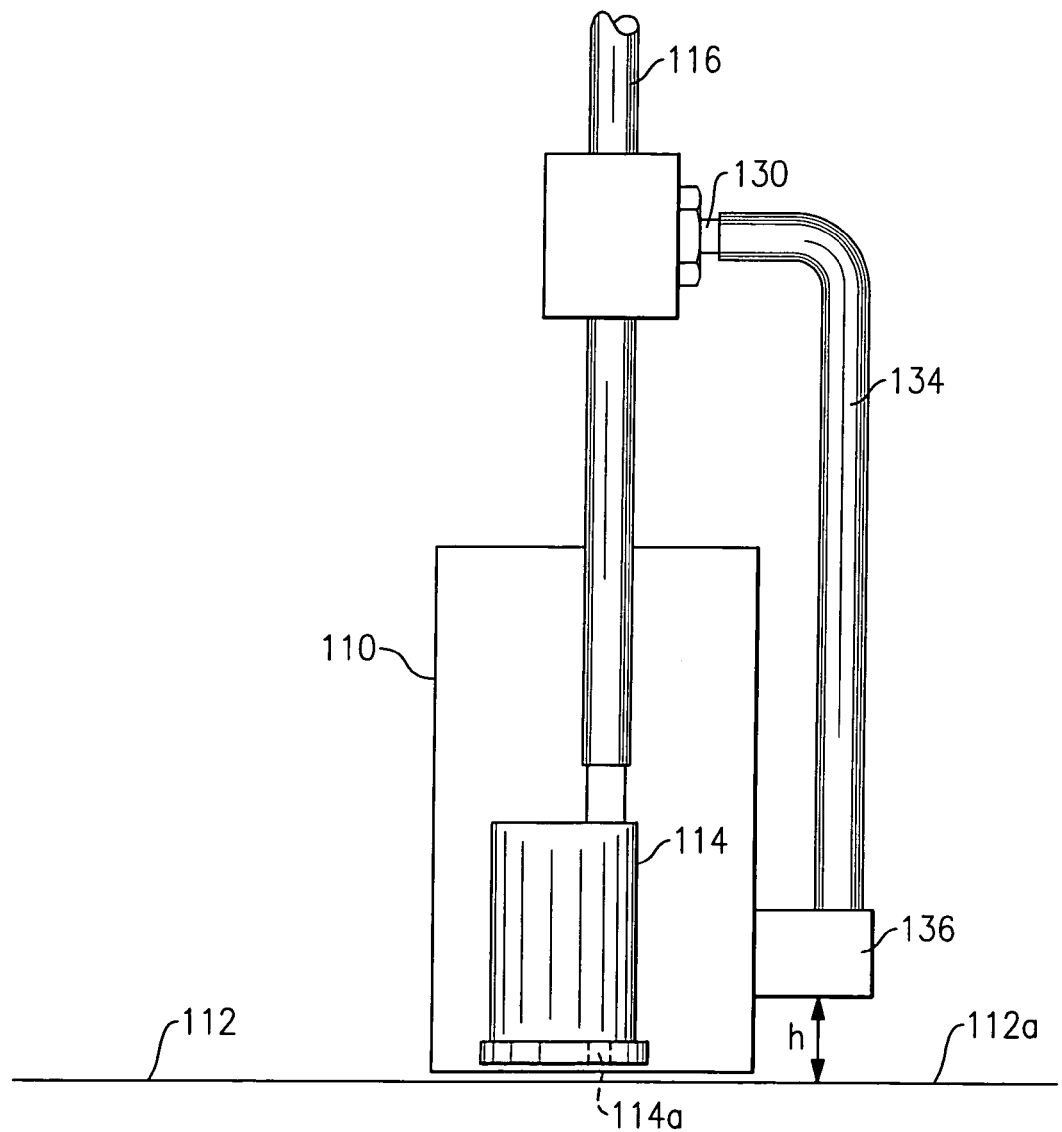
FIG. 2 is a simplified elevational view of components of a fuel delivery system in accordance with a second embodiment of the invention.

A second embodiment of the invention is seen in FIG. 2 wherein the auxiliary fuel line 134 connects directly to the main fuel line 116 rather than going first through the strainer 114 as in the embodiment of FIG. 1. In this second embodiment, fuel bypass valve 130 is provided between main fuel line 116 and auxiliary fuel line 134. When bypass valve 130 is open due to a restriction at strainer inlet 114a, fuel will be drawn from tank 112 through auxiliary intake port 136 which is positioned outside of reservoir 110 and above tank bottom 112a. Port 136 is positioned at a height h' of preferably about 1–50 mm above tank bottom 12a such that it is above any possible ice formation located at the bottom of the tank 112. If desired, an auxiliary fuel strainer (not shown) may be provided between main fuel line 116 and inlet 136.

In all embodiments of the invention, once the vacuum level has lowered to normal engine operating levels, the bypass valve will automatically close and fuel will be handled by the fuel system in the usual manner (i.e., by being drawn through the now unblocked strainer inlet 14a, 114a and delivered to the engine through main fuel line 16, 116).

It will thus be appreciated that the present invention provides a fuel bypass for a diesel fuel delivery system that maintains optimum fuel delivery to the engine despite the presence of an ice blockage at the fuel strainer.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel delivery assembly for delivering diesel fuel to a vehicle engine, said assembly comprising:
   a) a fuel reservoir positioned in a fuel tank having a bottom wall;
   b) a fuel strainer having a fuel inlet and a fuel outlet connected to a main fuel line leading to the engine, said fuel strainer positioned in said fuel reservoir;
   c) an auxiliary fuel inlet port positioned in said tank above said bottom wall and connected to an auxiliary fuel line which leads to said main fuel line; and
   d) a normally closed bypass valve connected to said auxiliary fuel inlet port and operable to open in response to a vacuum condition in said main fuel line above normal engine vacuum operating levels, said open bypass valve allowing diesel fuel to be drawn through said auxiliary fuel inlet port and auxiliary fuel line to said main fuel line and engine.

2. The assembly of claim 1 wherein said auxiliary fuel line connects to a top-mounted fuel inlet on said strainer and said main fuel line connects to a top-mounted fuel outlet on said strainer.

3. The assembly of claim 1 wherein said auxiliary fuel inlet port is located about 1 to 50 mm above said tank bottom wall.

* * * * *